Dec. 23, 1941.    W. E. MYERS    2,267,415
CLUTCH MECHANISM
Filed April 12, 1940    3 Sheets-Sheet 3
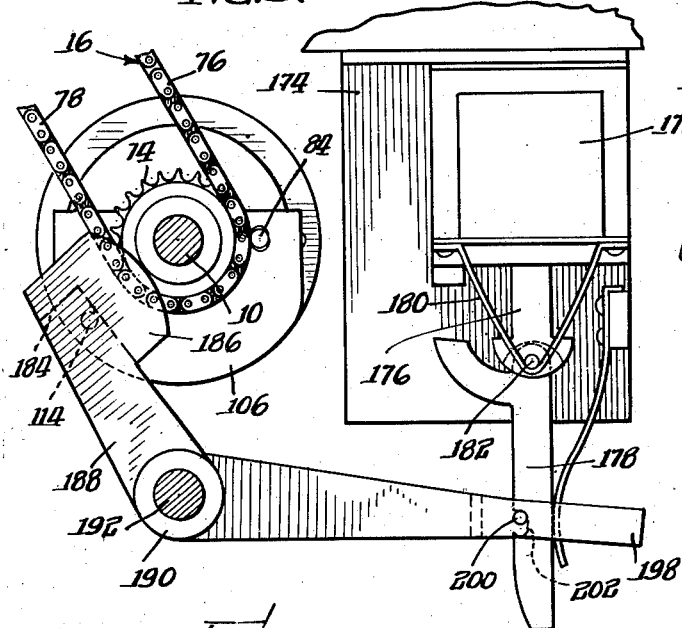
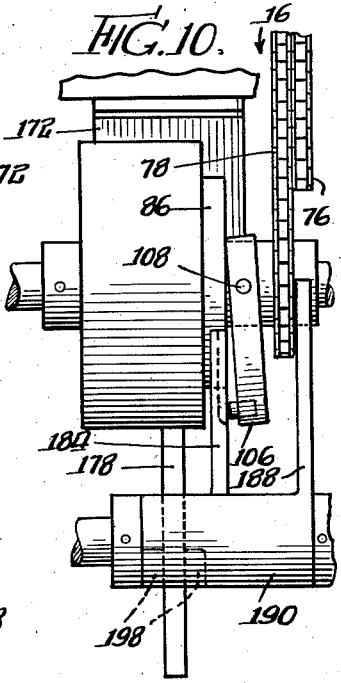
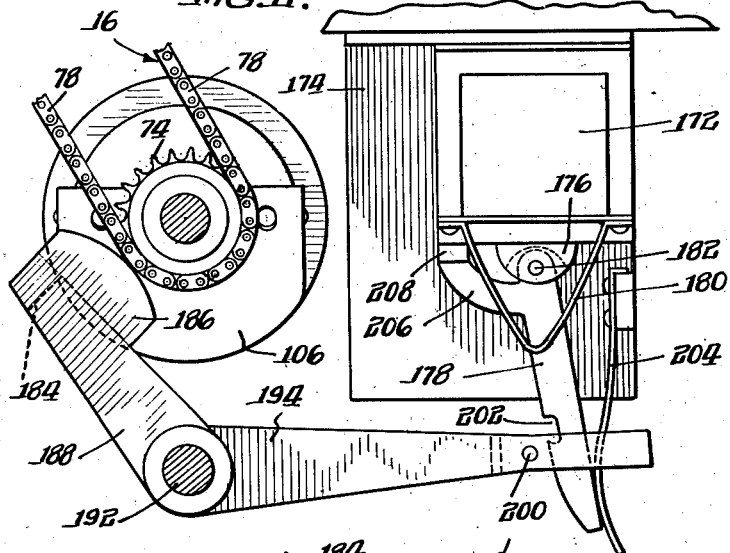
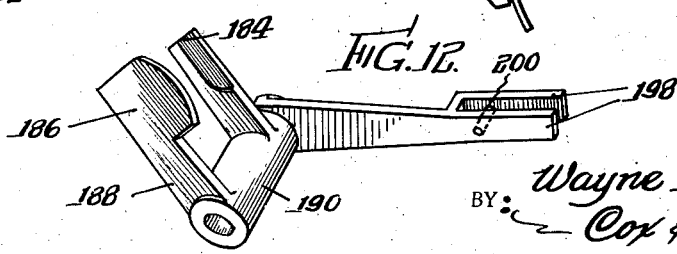
INVENTOR.
Wayne E. Myers
BY Cox & Moore
ATTORNEYS.

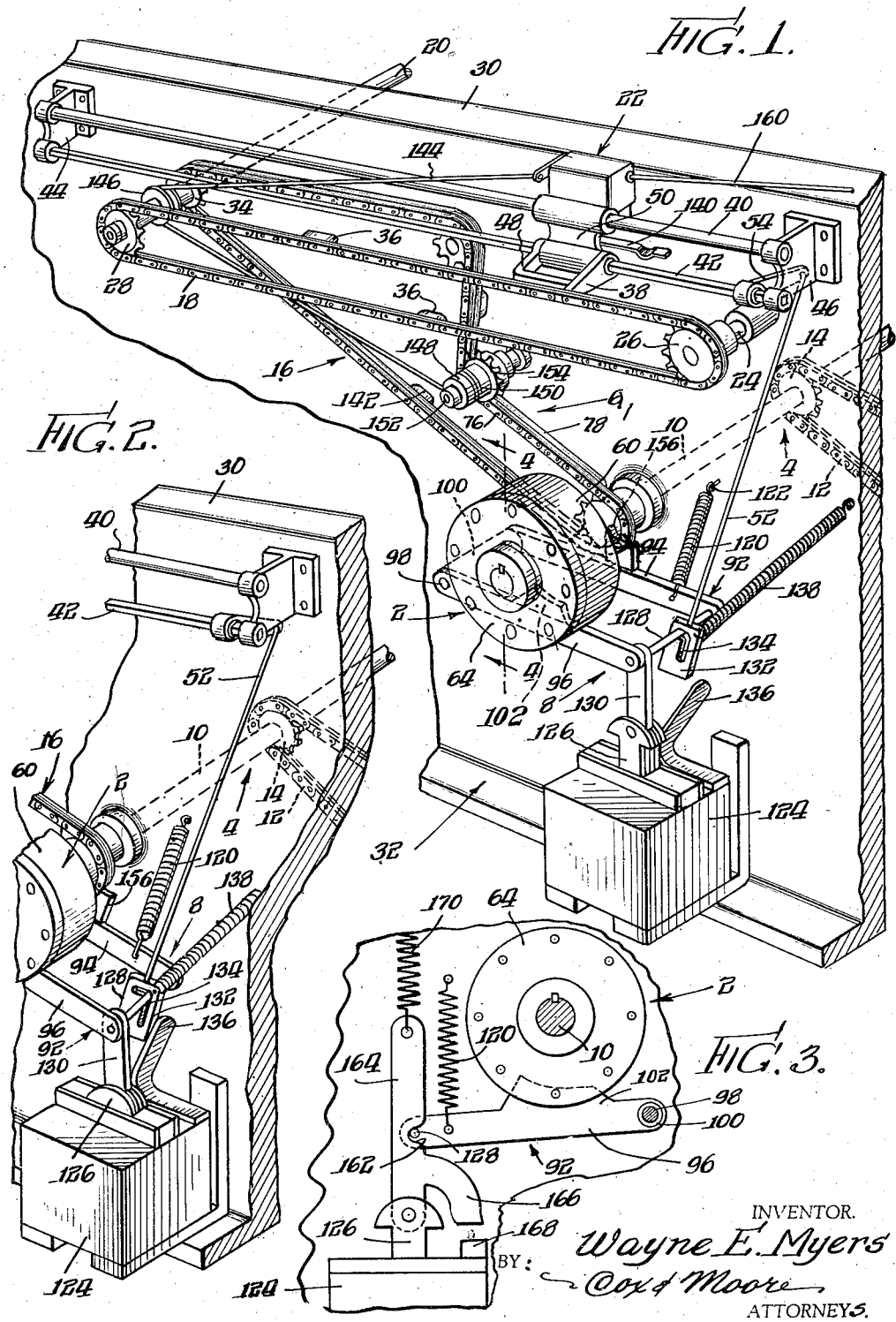

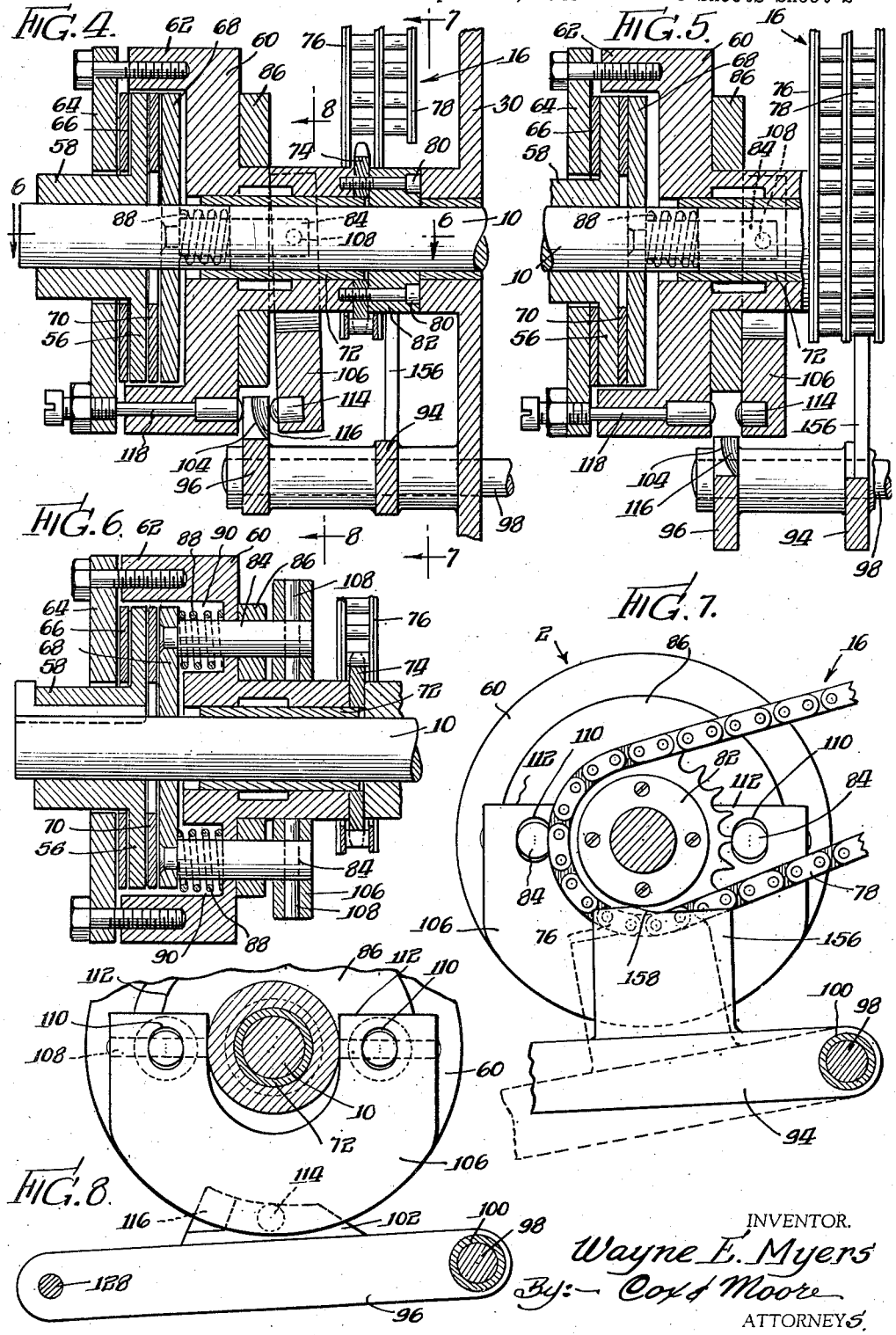

Patented Dec. 23, 1941

2,267,415

UNITED STATES PATENT OFFICE 2,267,415

CLUTCH MECHANISM

Wayne E. Myers, Benton Harbor, Mich., assignor to St. Joe Machines, Inc., St. Joseph, Mich., a corporation of Michigan Application April 12, 1940, Serial No. 329,230

13 Claims. (Cl. 192—33)

This invention relates to a clutch and clutch control.

An object of the invention is to provide a friction clutch for connecting a selected load device, preferably a mechanism driving chain, to a continuously operating driving mechanism, which clutch means is positive in operation to cause movement of the device to a given fixed distance upon each operation, yet generates no substantial amount of heat over a long period of continuous use.

Another object of the invention is to provide an electrically initiated, preferably electro-magnetically controlled, clutch which, upon reception of an initiating impulse, continues to drive a load device through a predetermined number of revolutions not withstanding cessation of the initiating impulse and from a continuously operating prime mover or driving mechanism.

Other and further objects and advantages of the invention will be apparent from the following description, when taken in connection with the accompanying drawings, wherein—

Figure 1 is a fragmentary view in perspective of a mechanism embodying the invention;

Fig. 2 is a fragmentary view of a portion of the mechanism shown in Figure 1 but with the parts thereof in a different position of operation;

Fig. 3 is a fragmentary view in elevation and partly in section of a modified form of mechanism with the operating solenoid and controlled lever system on the opposite side of the vertical axis through the driving shaft;

Fig. 4 is an enlarged fragmentary view in section taken along the line 4—4 of Figure 1;

Fig. 5 is a fragmentary section similar to Figure 4 but showing certain parts in a different position of operation;

Fig. 6 is a fragmentary horizontal section taken substantially along the line 6—6 of Fig. 4;

Fig. 7 is a vertical section taken along the line 7—7 of Fig. 4;

Fig. 8 is a fragmentary vertical section taken along the line 8—8 of Fig. 4;

Fig. 9 is a fragmentary view in elevation of a modified form of control mechanism;

Fig. 10 is a view in end elevation of the control mechanism shown in Fig. 9;

Fig. 11 is a view similar to Fig. 9 but with the parts in a different position of operation; and Fig. 12 is a view in perspective of a lever forming part of the control mechanism shown in Figs. 9–11.

This present application is a continuation-in-part of my prior application Serial No. 278,603, filed June 12, 1939.

As shown in the drawings, a mechanism embodying the invention comprises a clutch mechanism 2 for connecting the driving mechanism 4 to the driven mechanism 6 and a clutch control mechanism 8 in turn controlled by the driven mechanism 6.

As here shown, the driving mechanism 4 comprises the continuously operating driving shaft 10, driven by a prime mover such as an electric motor through a sprocket chain 12 and a sprocket 14 on the shaft 10.

The load device or mechanism 6 comprises a driven and timing chain 16, a timing chain 18, a driven shaft 20, and a combined slide member and control switch 22.

The timing chain 18 is driven by a shaft 24 which, as shown in the parent application, drives a first fold control, sheet measuring mechanism, the shaft 24 driving the chain through a sprocket 26 fastened to the outer end of the shaft. The chain 18 at its rear end passes about an idler sprocket 28 journaled on the shaft 20 for free rotation relative thereto. As shown in the parent application, the shaft 20 drives a second fold control sheet measuring mechanism for large sheets. The shafts 10, 20, and 24 are journaled in bushings secured to or formed integrally with the upstanding web 30 of the side frame 32 of the machine.

The shaft 20 is driven by the timing and driving chain 16 through a sprocket 34 secured to the shaft adjacent the web 30.

The combined switch and slide member 22 moves forwardly with the chain 18 during the operation of the shaft 24 to effect a first fold measurement of a sheet as illustrated in the parent application. For this purpose, lugs 36 are secured to the chain 18 and adapted to engage the side of an outwardly projecting arm 38 of the member 22. The member 22 slides on vertically spaced guide rods or bars 40 and 42, of which the rod 40 is fixedly mounted in longitudinally spaced brackets 44 and 46. The guide rod 42 is oscillatably mounted in these brackets and is secured to the arm 38 so that upon oscillation of the rod the arm will be raised and lowered. The downward movement of the arm 38 is limited by arm 48 secured to the opposite end of the web of the slide 50. The rod 42 is oscillated in a counterclockwise direction, as seen from the right of Figure 1, by a rod 52 through crank 54 secured to the forward end of the rod 42. The rod 52 is operated by the clutch control mechanism, as will presently appear, to release the slide from the chain 18 simultaneously with the release of the clutch and initiation of the operation of the timing and driving chain 16.

The clutch mechanism comprises a driving member or disk 56 having its hub portion 58 splined to the driving shaft 10. The driven clutch member comprises a disk 60 having an annular flange 62 overlying the disk 56 and to the annular flange is bolted the face plate or driven clutch disk 64 extending over the outer face of the disk 56. A friction disk or ring 66 is interposed between the outer face of the disk 56 and the inner face of the plate or disk 64. An auxiliary disk and clutch control member 68 is journaled on the shaft 10 and is free for limited axial movement on the shaft. A second friction disk or ring 70 is interposed between the inner face of the disk 56 and the outer face of the disk 68. The driven clutch member 60 is journaled onto shaft 10 by the bushing or sleeve 72 and is secured to the drive sprocket 74 for a continuous chain 76 of the driving and timing chain 16 which includes, in addition to the continuous chain 76, a discontinuous chain 78 fixed to the chain 76 as by means of common transverse pins extending through the links of both chains. A certain number of links in this chain 78 are removed at two points so that the chain may perform its clutch controlling function.

The drive sprocket 74 is secured to the driven clutch member 60 as by the screws 80 which also fasten a collar 82, journaled on shaft 10, to the clutch member 60.

The disk 68 is carried by a pair of diametrically spaced pins 84 slidably mounted in the disk 60 and in a hardened steel collar 86 secured to the hub of this disk 60. Coil springs 88, received in pockets 90 in the disk 60, embrace the pins 84 and bear against the disk 68 to urge this disk axially to the left, as seen in Figures 4 to 6, to compress the friction ring 70, to move the disk 56 axially to the left, and to compress the friction ring 66, thereby to frictionally connect the driving clutch member 56 to the clutch disks 64 and 68 and through these clutched disks and the pins 84 to the driven clutch member or disk 60. Axial movement of the clutch disk 68 to the right to release the driving connection between the driving and driven clutch members is effected by means of a clutch control yoke 92, forming part of the clutch control mechanism 8. The clutch control yoke 92 is provided with a pair of spaced bars 94 and 96, pivoted on the web 30 of the frame 32 for upward and downward movement by a pin or stud shaft 98 carried by the web 30. A sleeve 100 on the shaft 98 extends between the arms 94 and 96. On its outer arm 96, the clutch control yoke is provided with an upwardly projecting cam 102 having on its forward edge a beveled cam face 104 controlling the movements of a generally U-shaped hardened steel wobble plate 106 secured to the pins 84 at their outer ends as by the transverse pivot pins 108, the pins 84 being received within enlarged openings 110 in the arms of the wobble plate.

The wobble plate 106 is fulcrumed on the hardened steel collar 86 by the engagement of its free edges 112 with the face of the collar 86. The wobble plate carries a pin 114 provided with a rounded head to engage the cam 102. It will be evident that as the yoke 92 is moved upwardly, the cam 102 is projected between the face of the disk 60 and the wobble plate 106, and the beveled edge 116 of this cam, engaging the pin 114, forces this wobble plate in a counterclockwise direction as seen in Figure 4, thereby to move the pins 84 and the clutch disk 68 axially to the right to release the clutch rings 66 and 70, it being noted that the driving clutch disk 56 is mounted in a manner to permit a limited axial movement so that upon release of the clutch rings 66 and 70 the clutch disk 56 will also be released. An adjustable pin 118, in passing through the annular flange 62 of the disk 60, projects beyond the outer face of this disk to engage the face of the cam 102 opposite the pin 114 to prevent warping of this cam by its repeated operation.

The yoke member 92 is normally retained in its upper position by means of a coil spring 120 connected between the inner arm 94 of the yoke and a fixed abutment or pin 122 on the frame web 30, in which position the cam 102 projects between the disk 60 and the wobble plate 106 to hold the wobble plate in clutch-releasing position, thus rendering the clutch normally ineffective to drive the sprocket 74. Downward movement of the yoke 92 to release the wobble plate and initiate operation of the clutch is effected by a solenoid 124 which forms part of the clutch control mechanism 8. The armature 126 of the solenoid is connected to the cross rod 128 of the yoke 92 by a link 130. Downward movement of the yoke to initiate operation of the clutch also effects downward movement of the rod 52 to release the combined switch and slide member 22 from the chain 18. For this purpose the rod 52 is enlarged at its lower end to provide a web portion 132 having a slot 134 extending therethrough. The slot 134 is shaped in the form of an inverted L and receives the cross pin 128 of the yoke 92, the pin 128 normally resting in the upper transverse portion of the slot, as seen in Figure 1, when the clutch yoke is in its upper position.

A cam bar or strap 136 is mounted on the supporting frame for the solenoid 124 and extends upwardly therefrom at an appropriate angle to engage the web portion 132 of the rod 52 as it is moved downwardly by the solenoid and moves this rod 52 rearwardly relative to the pin 128 so that the vertical portion of the slot 134 will be aligned with the pin 128, thereby permitting the rod 52 to move upwardly under the action of a spring 138, even though the yoke is held in its lowered position. The spring 138 is fixed at one end to the frame web 30 and at the other end to the upper outer corner of the web portion 132 of the rod 52. This connection between the rod 52 and the clutch controlling yoke or frame 92 permits the rod 52 to be operated downwardly simultaneously with the operation of the clutch controlling yoke or frame but allows the rod to be moved upwardly to return the arm 38 to its normal horizontal position as soon as the driving lug 36 of the chain 18 has passed beyond this arm, while at the same time it allows the frame or yoke to remain in its lower position for a definite period of time.

The combined switch and slide member 22 carries a housing for a switch which is provided with an operating lever 140 that is operated by one or the other of two spaced lugs 142 carried by the discontinuous chain 78 of the timing and driving chain 16. Forward movement of the member 22 is effected by the chain 18, as previously described. Rearward movement of the member upon release from the chain 18 is effected by means of a chain, cable, or the like 144, secured at one end to the member 22 and passing rearwardly therefrom about a pulley 146, freely journaled on the shaft 20, and forwardly to a drum 148. The drum 148 constitutes a part of a friction clutch 150 carried by a shaft 152 and driven by a sprocket 154 journaled on the shaft and driven by the chain 76 of the driving and timing chain 16. The friction clutch 150 exerts only enough force on the cable 144 to move the slide member 22 along the guide bars 40 and 42 but readily yields or slips when the slide member is moved forwardly by the chain 18 or is stopped by engagement with the bracket 44.

The number of revolutions of the sprocket 74 for each operation of the clutch is determined by the discontinuous chain 78 of the double drive and timing chain 16 by means of a cam or stop 156 mounted on and projecting upwardly from the rear arm 94 of the yoke member 92. This cam or stop 156 is normally in engagement with the periphery of the collar 82, as shown in solid lines in Figure 7, and projects into the longitudinal plane of the chain 78 in the space between portions of this chain. Upon energization of the solenoid 124 the yoke member 92 is moved downwardly, thereby removing the cam or stop 156 from the path of the chain 78 and, the cam 102 being simultaneously moved downwardly, the clutch is rendered operative to drive the sprocket 74 and the chains 76 and 78. The solenoid 124 receives only a substantially instantaneous operating or initiating impulse, but the clutch mechanism operates through a predetermined number of revolutions and the cam 156 retains the yoke 92 in its lower position after the solenoid has become de-energized because after operation of the chain 78 has been initiated the links thereof overlie the cam 156, as shown in dotted lines in Figure 7, and prevent its upward movement.

In order to permit free movement of this chain 78 across the cam 156, the upper edge thereof is curved inwardly as at 158. When the driven clutch member and the sprocket 74 have rotated through a predetermined number of revolutions, a second portion of the chain 78, from which the links have been removed, reaches the cam 156 and this cam therefore moves upwardly under the force of the yoke spring 120, thereby allowing the cam 102 to operate the wobble plate 106 in a counter-clockwise direction, as seen in Figure 4, to render the clutch ineffective. The cam 156 then engages the forward link of the next portion of the chain 78, thereby acting as a positive brake on the driving and timing chain 16.

As described in the parent application, the travelling switch member 22 moves forwardly with a first fold, sheet measuring mechanism and as the mechanism completes its measuring operation the solenoid 124 is instantaneously energized to initiate operation of the clutch 2 and the release of the travelling switch from the chain 18. The travelling switch is then driven rearwardly along its guide bars by the clutch mechanism 2 through the friction clutch 150. As this travelling switch moves rearwardly, the driving and timing chain 16 drives the shaft 20 which, as pointed out in the parent application, drives a second fold measuring mechanism for large sheets and at the same time times the operation of the travelling switch to effect the second fold of small sheets. As the travelling switch moves rearwardly, the timing chain 16 is driven in a direction oppositely thereto by the clutch mechanism 2 as previously described and therefore after the lapse of a predetermined time, which time is determined by the position of the travelling switch at the instant of its release from the chain 18, one of the lugs 142 engages the switch arm 140 and moves this switch arm upwardly, thereby operating this switch to perform the controlling function of this switch. Electrical connection to the travelling switch is effected through the flexible electrical cable 160 wound on a spring reel (not shown).

In the modification shown in Figure 3, the cross pin 128 of the yoke 92 is normally received within a notch 162 of a bar 164 pivoted at its lower end to the armature 126 of the solenoid 124. The bar 164 is provided with a laterally and downwardly extending arm 166 which, as the bar 164 moves downwardly upon energization of the solenoid, engages a lug 168 carried by the solenoid frame or a supporting bracket for the solenoid. The lug 168 upon engaging the arm 166 pivots the bar 164 in a counter-clockwise direction as seen in Figure 3 and releases the cross pin 128 of the yoke 92 from this bar and allows the yoke to move upwardly under the force of the yoke spring 120. The cams carried by the yoke 92 are therefore positioned to exert their controlling action on the clutch as determined solely by the discontinuous clutch control chain 78. Upon deenergization of the solenoid, a spring 170 secured at one end to the bar 164 and suitably fixed at the other end moves the bar upwardly to re-position the notch 162 for reception of the cross pin 128 of the yoke, so that the solenoid if instantaneously re-energized may again operate the clutch. It will be evident that in this form of the invention the clutch may be controlled by a solenoid which is maintained energized over an appreciable period of time or, as shown in the parent application, during the entire time that the measuring mechanism which controls this solenoid is operating to measure the sheets or articles.

In the modification shown in Fig. 9, the actuating solenoid 172 is suspended from a support or bracket 174 and the armature 176 of the solenoid extends downwardly therefrom and is pivotally connected at its lower end to a bar 178, similar to the bar 164 in Fig. 3.

Downward movement of the bar 178 as caused by the weight of the armature and the weight of the bar is limited by a strap 180 fastened at its opposite ends to the frame of the solenoid and arranged in a looped formation to engage at the base of the loop a stop pin 182 carried by the bar 178. The controlling and controlled cams 184 and 186, similar in all respects to the cams 102 and 156, are formed on the arms of a yoke 188. The yoke 188 is formed integrally with a hub portion 190 journaled on a fixed pin or stud 192 and is provided with an integral arm or lever portion 194 extending from the hub portion toward the bar 178. At its outer free end the lever portion or arm 194 is provided with spaced parts 196 and 198 forming a guide in which is received the lower portion of the bar 178. The pin 200 extends between these spaced parts transversely of the guide passage for reception within a notch 202 formed in an edge of the bar 178 so that, by means of this pin 200 and the notch 202, the bar is releasably connected to the yoke 188. A spring strap 204, fastened at its upper end to the support or bracket 174, presses upon the bar 178 and urges it in a clockwise direction as seen in Figures 9 and 11 to cause the pin 200 to seat in the notch 202.

The bar 178 is provided with an upwardly extending arm 206 which is adapted, upon upward movement of the bar, to engage a fixed lug 208 and cause a counter-clockwise rotation of the bar to release the bar from the yoke 188. The weight of the arm 194 of the yoke may be made such as to overbalance the opposite arms of the yoke or an additional weight may be imposed upon the arm 194 so that by the action of gravity the yoke is continuously urged in a clockwise direction to maintain the controlled cam 186 in engagement with the driven member or chain and to urge the clutch controlling cam 184 toward the wobble plate 106 of the clutch and into the position shown in Figure 10.

Upon energization of the solenoid 172, the armature 176 is drawn upwardly to rotate the clutch control yoke 188 in a counter-clockwise direction, moving the cam 184 clockwise away from the wobble plate and the cam 186 out of the path of the driven chain. As the bar 178 approaches its upper limit of movement, its arm 206 is engaged by the fixed lug 208 so that the bar is rotated in a counter-clockwise direction, releasing the pin 200 from the notch 202. The yoke is thus freed from the solenoid for control solely by the driven chain. When the chain has been moved the desired predetermined distance, the space between the removed links of the control portion of the chain permits the cam 186 to be projected by the yoke into the path of the chain and the controlling cam 184 to re-engage and move the wobble plate in a direction to move the clutch members into de-clutching position. The spring 204 acts, when the solenoid has been de-energized, to move the bar 178 in a clockwise direction to reseat the pin 200 in the notch 202 and thus reset the device for subsequent operation. It will be observed that in the modification shown in Figures 9–12 yoke controlling springs are avoided and the operation of the yoke made more positive and certain.

It will be seen from the foregoing description that applicant has provided a friction clutch for connecting a selected load device, preferably a mechanism driving chain, to a continuously operating driving mechanism, which clutch means is positive in operation to cause movement of the device to a given fixed distance upon each operation, yet generates no substantial amount of heat over a long period of continuous use. It will also be apparent that applicant has provided an electrically initiated, preferably electro-magnetically controlled, clutch which, upon reception of an initiating impulse, continues to drive a load device through a predetermined number of revolutions notwithstanding cessation of the initiating impulse and from a continuously operating prime mover or driving mechanism.

The invention is hereby claimed as follows:

1. In combination, a continuously operating driving shaft, a driven shaft, a first disk secured to said driving shaft for rotation therewith, a second, driven and control disk slideably and rotatably mounted on said driving shaft and operatively connected to said driven shaft, a friction force transmitting member interposed between said first and second disks, means for moving said control disk axially of said driving shaft to operatively engage said member with said first and second disks thereby to connect said driving and driven shafts, and means operatively controlled by the driven shaft for moving said control disk axially of the driving shaft in the opposite direction to disengage said member from said first and second disks, thereby to disconnect said driving and driven shafts.

2. In combination, a continuously operating driving shaft, a normally stationary shaft to be driven by said driving shaft, a driving disk secured to said driving shaft, a driven disk operatively connected to the driven shaft, a control disk mounted on said driven disk for rotation therewith and for slideable movement toward and from the driving disk, a friction disk interposed between said driving disk and said control disk, means for moving said control disk toward the said driving disk to clamp the friction disk between said driving and control disks thereby to connect the driving shaft to the driven shaft, clutch releasing means operatively connected to said control disk to move the control disk away from the driving disk to release the friction disk from said driving and control disks, and means operatively connected to said driven shaft for actuating said clutch releasing means as said driven shaft completes a predetermined angular movement.

3. In combination, a driving shaft, a driving member secured to said shaft for rotation therewith, a driven member movable axially of the shaft, friction coupling means interposed between said driving and driven members, means urging said driven member axially of the shaft into a position clamping the frictional means therebetween to frictionally couple the driving and driven members, means for moving said driven member in the opposite direction into a de-clutching position relative to the driving member, and means positioned for control by said driven member and positioned to control said de-clutching means for preventing operation of said de-clutching means during a predetermined movement of the driven member.

4. In combination, a driving shaft, driving and driven members on said shaft and relatively movable axially of the shaft into clutch and de-clutching positions, a chain connected to said driven member for operation thereby, means normally urging said driving and driven members into clutching position, means for moving said members relatively against the action of said urging means into a de-clutching position, means for operating said last-mentioned means to release the members for movement into clutching position under the action of said urging means, and means including the chain for maintaining said moving means in released position during a predetermined movement of the driven member.

5. In combination, a driving shaft, a driving disc secured to said shaft for rotation therewith, a driven disc mounted on said shaft for movement axially thereof into clutching and de-clutching positions relative to the driving disc, spring means urging said driven disc into clutching position, means including a latch retaining said driven disc in a de-clutching position against the action of said urging means, a power actuator, a releasable connection between said actuator and said latch for moving said latch into an inoperative position permitting movement of the driven disc into clutching position under the action of said urging means, means automatically releasing said releasable connection upon operation of said latch, and means controlled by said driven disc for maintaining said latch in the position permitting clutching of said disc during a predetermined movement of the driven member.

6. In combination, a driving shaft, a driving disc mounted on said shaft for rotation therewith, a driven disc mounted on said shaft for movement axially thereof into clutching and declutching positions relative to the driving disc, means urging said driven disc into clutching position, gravity operated means for maintaining said driven disc in de-clutching position against the action of said urging means, a power actuator controlling said gravity operated means to release the driven disc for movement into clutching position, and means operatively controlled by the driven member and controlling the return of said gravity operated means into normal position independently of the power actuator.

7. In combination, driving and driven clutch discs relatively movable into clutching and declutching positions, a spring for urging said discs relatively into clutching position, a lever connected to the driven disc, a shiftable support carrying an abutment adapted when said support is in a first position to engage said lever to hold the discs in de-clutching position, means normally urging said shiftable support to said first position, a second abutment carried by said support, a member connected to the driven disc and having a portion engaging said second abutment when said support is in a second position thereby to prevent movement of said shiftable support to said first position during a predetermined movement of the member, said member having a portion receiving said second abutment upon completion of said predetermined movement to permit movement of said support to said first position, and a solenoid having an armature connected to said shiftable support for moving said support to said second position thereby to disengage the first abutment from the lever and remove the second abutment from said member.

8. In combination, a driving shaft, a driving clutch disc secured to said shaft, a driven disc loosely journalled on said shaft, a driven clutch disc co-axial with said shaft and interposed between the first clutch disc and said driven disc, said second clutch disc being mounted on said driven disc for rotation therewith and for slidable movement in a direction axially of the shaft into coupling engagement with the first clutch disc, means normally urging the second clutch disc into coupling engagement with the first clutch disc, a control member connected to the second clutch disc for moving the second clutch disc against the action of said urging means into a de-clutching position, a shiftable support carrying a first cam-like abutment normally engaging said control member to hold the second clutch disc in de-clutching position, a second abutment carried by said shiftable support, a member driven by said driven disc and having a portion adapted to engage said second abutment to hold the shiftable support in a position where the first abutment is out of engagement with said control member and a second portion receiving said second abutment to permit shifting of said support to the position where the first abutment engages the control member, and a solenoid having its armature connected to said shiftable support for moving the first abutment out of engagement with the control member and the second abutment out of the second portion of the member driven by the driven disc.

9. In combination, a driving shaft, a first clutch disc secured to said driving shaft, a driven disc journalled on said shaft, a second clutch disc interposed between the first clutch disc and said driven disc, said second clutch disc being mounted on the driven disc for rotation therewith and for slidable movement in a direction axially of the shaft into coupling engagement with the first clutch disc, a clutch control plate connected to the second clutch disc and shiftable to move said second clutch disc into coupling and uncoupling positions, a shiftable support, a cam-like abutment carried by said support and engageable with said plate to hold said plate in a position in which the second clutch disc is uncoupled from the first clutch disc, a chain connected to the driven disc, a second chain secured to the first chain, a second shiftable support, a second abutment carried by said second shiftable support, said second chain being interrupted to receive in the interruptiton the second abutment, the second chain being adapted to overlie the second abutment in contact therewith when the interruption in the chain is not positioned to receive this second abutment, whereby to hold the first abutment out of engagement with the control plate during a predetermined movement of the first chain, and means for moving said shiftable supports simultaneously to move the first abutment out of engagement with the control plate and the second abutment out of the interruption in the second chain.

10. In combination, a driving shaft, a clutch disc secured to said driving shaft, a driven disc, a second clutch disc secured to the driven disc for rotation therewith and for slidable movement relative thereto into coupling and uncoupling positions with respect to the first clutch disc, a shiftably mounted member connected to the second clutch disc for moving said disc into uncoupling position, means for normally urging said disc into coupling position, a lever carrying a cam-like abutment normally engageable with said control member to move the member into a position causing the second clutch disc to be uncoupled from the first clutch disc, means normally holding said lever in the position in which the cam-like abutment engages the control member, instantaneously actuated and released means for moving said lever in a direction to release the abutment from the control member, thereby permitting the second clutch disc to become coupled with the first clutch disc, a member driven by the driven disc, a second lever interlocked with the first lever for movement simultaneously therewith, said second lever having a second abutment, said driven member having a portion to receive the second abutment and a portion of predetermined length adapted to engage said second abutment and prevent return of the first lever to a position in which the cam-like abutment engages the control member.

11. In combination, a driving shaft, a clutch disc secured to said shaft, a driven member, a second clutch disc secured to said member for rotation therewith and for slidable movement toward and from the first clutch disc to couple and uncouple the driven member to and from the driving disc, said driven member having a hardened surface portion, a control plate fulcrumed on said hardened surface portion of the driven member and extending in parallel relation to a surface of said driven member, a lever carrying a cam-like abutment for interposition between the surface of the driven member and the control plate for moving said control plate relatively away from said driven member, a connection between said control plate and the second clutch disc for moving the second clutch disc away from the first clutch disc upon interposition of the cam-like abutment between the control plate and a surface of the driven member, a second lever interlocked with the first lever for movement simultaneously therewith, a second abutment carried by the second lever, a control member connected to and driven by the driven member, said control member having a portion thereof for receiving the second abutment when the first abutment is interposed between the control plate and the surface of the driven member, said control member also having a portion of predetermined length engaging the second abutment to hold the first abutment out of engagement with the control plate during a predetermined movement of the driven member, means for normally urging said levers in one direction to interpose the first abutment between the control plate and a surface of the driven member and to cause the second abutment to be received in the control member, and instantaneously actuated and released means for moving said levers in the opposite direction.

12. In combination, a driven member, a driving shaft, a releasable clutch means for connecting the driven member to the driving shaft, a clutch control member, said clutch means comprising members relatively movable into coupling and uncoupling positions, a connection between one of said clutch members and said control member, means urging said members into coupling position, a solenoid, a lever, a releasable connection between said lever and the armature of said solenoid, a cam carried by said lever, means urging said lever into a position in which said cam engages the control member and holds said control member in a clutch releasing position, a second lever interlocked with the first lever for movement simultaneously therewith, means driven by the driving member and including an element having a portion normally receiving a second abutment carried by the second lever and having a portion of predetermined length adapted to engage the second abutment to hold the levers in a position in which the first abutment is out of engagement with the clutch control member for a predetermined movement of the driven member, and means for automatically releasing the connection between the first lever and the armature of the solenoid upon actuation of the lever by the solenoid.

13. In combination, a driving shaft, driving and driven frictionally coupled members on said shaft and relatively movable axially of the shaft into de-clutching position, means urging said driving and driven members into a clutching position, clutch releasing means for moving said members relatively and axially of the shaft to de-clutching position against the action of said urging means, means for rendering said clutch releasing means normally effective to hold said members in de-clutching position, a solenoid having an armature connected to said clutch releasing means to render said clutch releasing means ineffective upon energization of the solenoid thereby to permit movement of the members into clutching position, and a cam positioned for control by the driven member and positioned to control the clutch releasing means to maintain said clutch releasing means ineffective independent of the energization of the solenoid and for a predetermined movement of the driven member.

WAYNE E. MYERS.